US005101345A

United States Patent [19]

MacPhail

[11] Patent Number: 5,101,345
[45] Date of Patent: Mar. 31, 1992

[54] METHOD OF FILING STAPLED DOCUMENTS WITH A STAPLE RELATIONSHIP INVOLVING ONE OR MORE APPLICATION PROGRAMS

[75] Inventor: Margaret G. MacPhail, Austin, Tex.

[73] Assignee: International Business Machines Inc., Armonk, N.Y.

[21] Appl. No.: 277,369

[22] Filed: Nov. 29, 1988

[51] Int. Cl.$^5$ .............................................. G06F 7/20
[52] U.S. Cl. ................................. 395/600; 364/283.1; 364/282.1; 364/254; 364/222.81; 364/DIG. 1
[58] Field of Search ... 364/200 MS File, 900 MS File, 364/518

[56] References Cited

U.S. PATENT DOCUMENTS

| | | | |
|---|---|---|---|
| 4,121,196 | 10/1978 | Johnson et al. | 364/900 |
| 4,358,016 | 11/1982 | Richardson et al. | 364/478 |
| 4,404,649 | 9/1983 | Nunley et al. | 364/900 |
| 4,445,195 | 5/1984 | Yamamoto | 364/900 |
| 4,485,454 | 11/1984 | Kimoto | 364/900 |
| 4,503,515 | 3/1985 | Cuan et al. | 364/900 |
| 4,553,261 | 11/1985 | Froessl | 340/707 |
| 4,601,003 | 7/1986 | Yoneyama | 364/518 |
| 4,604,653 | 8/1986 | Shimiza | 364/518 |
| 4,611,298 | 9/1986 | Schuldt | 364/900 |
| 4,631,664 | 12/1986 | Bachman | 364/200 |
| 4,656,343 | 5/1987 | Gerritsen et al. | 235/454 |
| 4,663,615 | 5/1987 | Hernandez et al. | 340/721 |
| 4,674,040 | 6/1987 | Barker et al. | 340/734 |
| 4,712,174 | 12/1987 | Minkler, II | 364/200 |
| 4,713,754 | 12/1987 | Agarwal et al. | 364/200 |
| 4,751,740 | 6/1988 | Wright | 364/900 |
| 4,805,099 | 2/1989 | Huber | 364/200 |
| 4,807,182 | 2/1989 | Queen | 364/900 |
| 4,811,207 | 3/1989 | Hakita | 364/200 |
| 4,816,655 | 3/1989 | Musyck et al. | 235/380 |
| 4,827,447 | 5/1989 | Croes et al. | 364/900 |
| 4,864,497 | 9/1989 | Lowry | 364/200 |
| 4,868,733 | 9/1989 | Fujisawa | 364/200 |
| 4,876,665 | 10/1989 | Iwai et al. | 364/900 |
| 4,912,669 | 3/1990 | Iwanoto et al. | 364/900 |
| 4,933,848 | 6/1990 | Haderle | 364/200 |
| 4,947,320 | 8/1990 | Crus | 364/200 |

OTHER PUBLICATIONS

Delisle et al., "Neptune: A Hypertext System for CAD Applications", ACM, Jan. 1986, pp. 132-143.
Halasz, "Reflections on Notecards: Seven Issues for the Next Generation of Hypermedia Systems", Communication of the ACM, vol. 31, No. 7, Jul. 1988, pp. 836-852.
Gregory, "Xanadu: Hypertext from the Future", Dr. Dobb's Journal, No. 75, Jan. 1983, pp. 28-35.
Research Disclosure, 10th Oct. 1989, RD306034, Industrial Opportunities Ltd., Havant, GB; N.N.: "Affinity Support for Document Stapling-Permits Stapling of Personal and Non-Personal Documents and Limits Afinity Recipient Access".
Research Disclosure, 10th Oct. 1989, RD306046, Industrial Opportunities Ltd., Havan, GB; N.N.: "New, Old, Unopen & Open Attribute Method for Stapled Documents-Permits Stapled Documents to Maintain Certain Level of Incoming Call Characteristics when Received as Mail".
Research Disclosure, 10th Oct. 1989, RD306013, Industrial Opportunities Ltd., Havan, GB; N.N. "Status Reporting Method for Stating that Document-C Stapled to Document-B, Had Caused System Error".

Primary Examiner—Thomas C. Lee
Assistant Examiner—Eric Coleman
Attorney, Agent, or Firm—Casimer K. Salys; H. St. Julian

[57] ABSTRACT

This invention relates to a method of establishing a staple relationship between two documents within a context of an application program. An end user indicates to the system that a staple relationship is to be established between two identified documents. The end user enters a definition of the staple relationship which includes any attributes to be associated with the identified documents within the staple relationship and the identity of at least one application within whose context the relationship is to exist. The system will create the staple relationship and file the identified documents in a library within the context of the specified application. The system then maintains the staple relationship between the identified documents within the context of the specified application.

2 Claims, 5 Drawing Sheets

| PARAMETER | OCCURENCE |
|---|---|
| ATTRIBUTE PARAMETER SET | REQUIRED |
| FOLDER PARAMETER SET | CONDITIONAL |
| DOCUMENT IN FOLDER PARAMETER SET | CONDITIONAL |
| STAPLEE PARAMETER SET | CONDITIONAL |
| STAPLER PARAMETER SET | CONDITIONAL |

FIG. 3

| PARAMETER | OCCURRENCE | MODIFY | SYSTEM |
|---|---|---|---|
| FOLDER ATTRIBUTE | REQUIRED | NO | SET |
| DOCUMENT IN FOLDER ATTRIBUTE | REQUIRED | NO | SET |
| FOLDER - ONLY ATTRIBUTE | REQUIRED | YES | - |
| STAPLEE ATTRIBUTE | REQUIRED | NO | SET |
| STAPLER ATTRIBUTE | REQUIRED | NO | SET |

FIG. 4

| PARAMETER | OCCURRENCE | MODIFY | SYSTEM |
|---|---|---|---|
| ATTRIBUTES | REQUIRED | - | SET |
| RELATED DOCUMENT | REQUIRED | - | SET |

FIG. 5

| SUBPARAMETER | OCCURRENCE |
|---|---|
| STAPLER LIBRARY ASSIGNED DOC. NAME | REQUIRED |
| DOCUMENT NAME | REQUIRED |
| CONTEXT | REQUIRED |
| ADD DATA | REQUIRED |
| REMOVE DATA | CONDITIONAL |

FIG. 6

3
METHOD OF FILING STAPLED DOCUMENTS WITH A STAPLE RELATIONSHIP INVOLVING ONE OR MORE APPLICATION PROGRAMS

CROSS-REFERENCE TO RELATED APPLICATIONS

This application is related in subject matter to the following applications filed concurrently herewith and assigned to a common assignee:

Application Ser. No. 07/277,385 filed by M. G. MacPhail entitled "Method of Filing Stapled Documents Within A Context of A Folder".

Application Ser. No. 07/277,387 filed by M. G. MacPhail entitled "Method of Filing Stapled Documents".

Application Ser. No. 07/277,390 filed by M. G. MacPhail entitled "Method of Distributing Stapled Documents".

The foregoing copending applications are incorporated herein by reference.

TECHNICAL FIELD

This invention relates to methods of managing documents in an information processing system and more particularly, to methods of filing stapled documents in the information processing system within the context of an application program.

BACKGROUND INFORMATION

In recent times, automation of offices is rapidly becoming a reality for an increasing number of organizations. Office automation helps the organizations integrate data files with text, store and retrieve correspondence and reports electronically, distribute documents electronically and support the day-to-day activities of administrative personnel, professionals and managers.

While some of the benefits of electronic document processing can be realized from a single, stand-alone office system, a network which connects office systems in various locations in the organization increases the productivity of the organization. Physically, a network is a combination of interconnected pieces of equipment and programs used for moving information between points where it may be generated, processed, stored and used. From the viewpoint of an user of the network, the network is a collection of services which are useful in creating, revising, distributing, filing and retrieving documents.

In today's electronic office, documents are physically grouped or stored using one of the following techniques: partition data sets, directories and folders. Partition data sets are storage areas on a disk or other form of storage medium. Documents stored in a partition data set only exist in that storage area and a partition data set can not be deleted until all of the documents included therein have been removed. Generally, the documents are filed in the partition data set in the order created and there is no other relationship regarding the order to the documents.

Directories are similar to partition data sets in that they are physical storage areas for documents for files. Documents can not exist in more that one physical storage area. The documents contained in a directory are not logically organized.

In regards to both the partition data sets and the directories, if a user filed a group of documents which are related to a general topic and wanted to review the group of documents, the user would have to first locate the partition data set or sets or the directory or directories containing the documents. In partition data sets and directories, documents have to be deleted from the bottom up. Additionally, it is very difficult to rearrange documents stored or grouped using these two techniques. The documents must be copied and then deleted. Moreover, partition data sets, except for the contents thereof, can not be distributed. Directories can not be distributed in their entirety. Linear and hierarchical groupings can not be distributed using directories or partition data sets because the groupings mechanism utilized therewith will be lost. This type of operation technique reduces the efficiency of the electronic office.

Folders are documents which form hierarchical and linear relationship between a group of documents. Folders can be nested to form the hierarchical relationship whereby the group of documents within a folder are ordered to form the linear relationship. The documents within a folder are organized sequentially by a specified descriptor or by a specified position number. Access to a folder is independent from the documents contained therein. Documents within a folder can be manipulated as a single document, as a set of documents which comprise the entire folder or as a set of documents which comprise a specified level of the folder document.

A folder can be used to form a directed or one-to-one relationship between two documents. This requires the folder to be a first document and a document contained therein to be a second document. The relationship suffers in that not all documents are folders and if any other documents are entered into the folder, the one-to-one relationship between the first and the second document becomes unclear.

The use of partitioned data sets and directories in establishing directed relationships between two documents suffers from limitations which are similar to those as a result of using a folder. There is no way to identify which document is coupled to another, when more than two documents are included in a partitioned data set or directory, the one-to-one relationship is lost and the forms of grouping documents requires the creation of a new folder, directory or partition to establish the relationship.

Consequently, what is needed is a technique for establishing a directed relationship between documents without creating additional documents or groups.

DISCLOSURE OF THE INVENTION

This invention relates to methods of establishing a directed relationship between at least two documents stored in an information processing system within the context of an application program. An end user indicates to the system that a staple relationship is to be created between at least two identified documents stored in therein. The staple relationship is then defined by entering an indication that the staple relationship is restricted to the application program, a name of the application, stapler/staplee attributes of the at least two documents including whether or not history is to be maintained and pointers to the physical locations of the at least two documents in the system. In response to the entry of the data defining the staple relationship, an add or file request is transmitted to a library server along with copies of any documents which are not filed in a library. The server then sets data objects associated with the identified documents to reflect the staple relationship. Thereafter, the server files the identified documents into the library as specified by the staple relationship defined by the end user.

BRIEF DESCRIPTION OF THE DRAWING

FIGS. 3 through 6 are object structures which are employed in establishing a staple relationship within a context of an application.

BEST MODE FOR CARRYING OUT THE INVENTION

Figure 1:
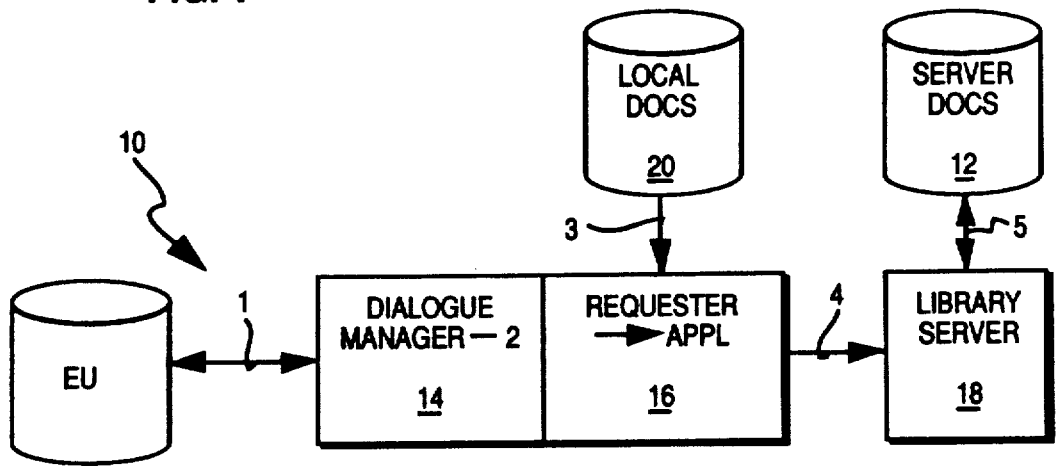
FIG. 1 is a block diagram of a document management system in accordance with the principles of the present invention.

FIG. 1 shows a document management system 10 which controls the creation, retrieval, editing and distribution of documents within an information processing system. Moreover, the document management system 10 enables an end user (EU) to file a pair of documents in the system 10 which are coupled together in a stapled relationship within the context of an application. In essence, a stapled pair of documents to be filed consists of documents copied from the EU's local storage, the server's storage or a combination of both. Thus, the EU creates the staple relationship by interacting with a dialogue manager application 14 providing the data which is necessary to establish the staple relationship between the pair of documents. The necessary data includes addressing information for access control, contextual-search characteristics, requester/principle identifiers and a definition of the stapled pair of documents. The definition of the stapled pair includes an indication that a document is stapled by another document and pointers to the physical location of all of the documents to be filed. These documents can be directly accessible to the requester application 16 or they can be directly accessible to the requester's server 18. After the dialogue manager application 14 has gathered the above-identified information, it transmits the information to the requester application program 16.

The requester application application program 16, in response to input from the dialogue manager application 14, builds an add or a file request and transmits the request to the requester's server 18. The file request is built when at least one of the documents specified in the request to be a part of the staple relationship is not stored in a library 12. The add request is built when all of the documents specified in the request are stored in the library 12. The requester application program 16 makes a copy of each of the locally accessible documents identified by the EU which are stored in a local storage medium 20. The copies of the documents are transmitted to the requester's server 18 along with the request. Additionally, the requester application program 16 transmits pointers to the physical location of all of the documents identified in the request which are stored in the library 12 and not otherwise identified by the folder document containing the documents.

The requester's server 18 files the stapled documents into the library 12 as specified in the file request. The appropriate staple relationship will be established and maintained as specified in the file or add request.

The document management system 10 shown in FIG. 1 utilizes a uniform structure for exchanging information within the system. This structure includes an encoding scheme which is designed to convey any document, irrespective of it content, from one type of office system to another and to communicate the intent of the person creating or transmitting a document as to the method of processing thereof. One type of structure which meets all of these requirements is the Document Interchange Architecture (DIA) which is a part of a DISOSS office system marketed by the International Business Machines Corporation.

DIA is a program-to-program communication architecture which defines the protocols and data structures that enable programs to interchange information such as documents and messages in a consistent and predictable manner. DIA is independent of the type of information managed by DIA services. DIA includes document objects which contain parameters or descriptors that describe the contents of the information being transmitted. The descriptors contained in the objects include the name under which the information is filed, the authors, the subject of the information and the date the information was filed in the document history. These descriptors enable a document to be searched in a storage medium such as the server library 12.

The server library 12 performs various services for the system 10. These services are used for storing and retrieving documents electronically. Whenever a document is filed in the server library 12, a set of descriptors called a document profile is filed with it. The profile contains the descriptors noted above. Document profiles are used in searching for documents in the library 12. For purposes of illustration and not limitation, a EU can ask the system 10 to search for all documents regarding a particular subject and by a certain author which was filed in the library 12 between any two dates. Upon completing the search, the system presents the EU with a list of the documents which meet the search criteria. The EU could then ask the system 10 to retrieve a copy of a specific document on the list from the library an deliver the copy the EU for printing or viewing.

The server library 12 also provides the following services: file documents in and retrieve or delete documents from the library; update work in progress documents in the library; specify a security level to associate with the document that is being filed; allow authorized end users other than the EU who filed the document to retrieve the document from the library and perform searches for and retrieve documents in the library for other end users. The server library 12 assigns each new document filed in therein a unique name called a library-assigned document name (LADN). This name is returned to the requester and can be used to uniquely identify the document at some later time.

Figure 2:
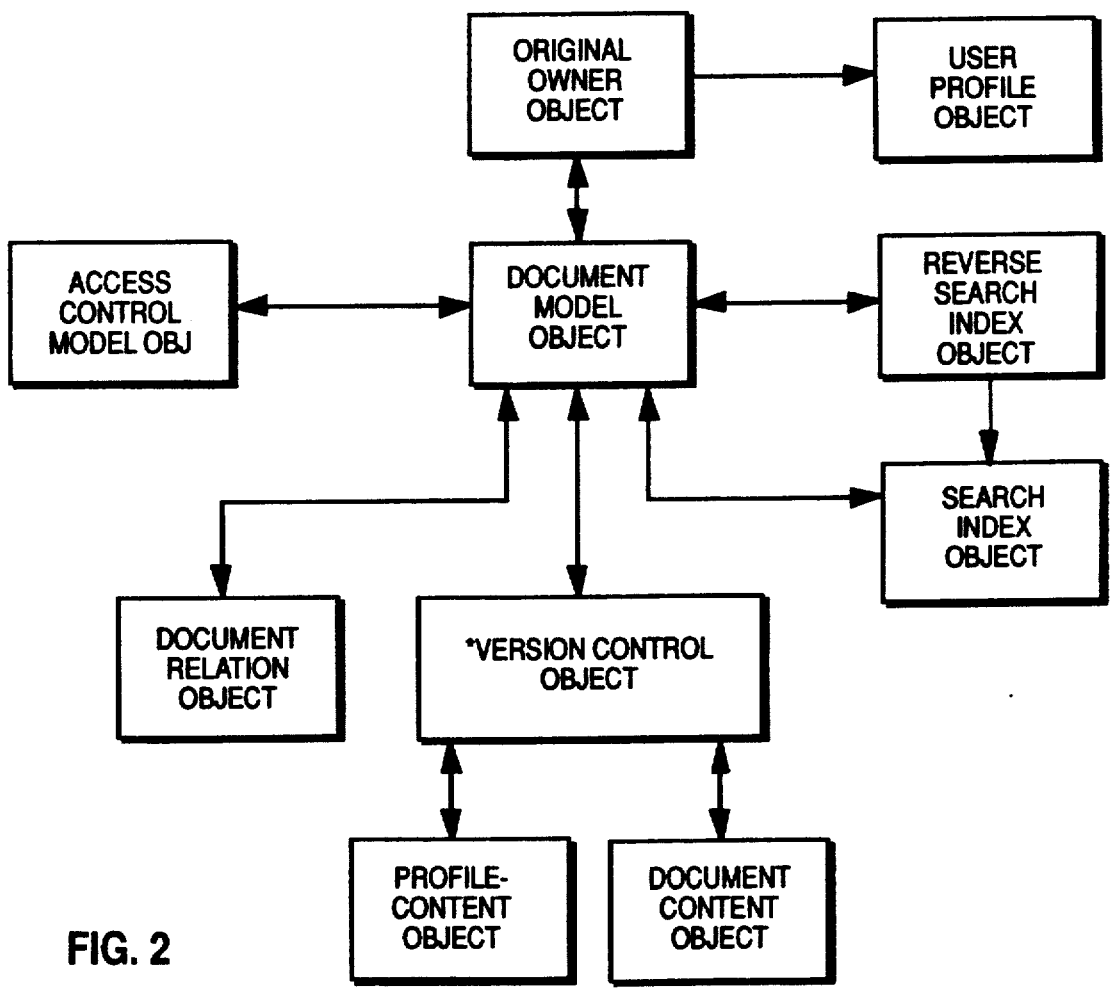
FIG. 2 is a model of a document showing the various objects associated with a document stored in the system of FIG. 1.

Referring to FIG. 2, each document stored in the server library 12 includes the objects shown therein. All of the objects shown in FIG. 2 are created in response to the processing a FILE command. A document model object contains information concerning ownership and attributes of a specific document. This object controls the access to the document during its life in the library.

An original owner object contains or points to information used by an owner of the document to control access to the document as filed.

A document content object provides for the storage of the document content and for saving information relating to the actual size of the filed document.

A document relation object describes the logical relationships between the document and other documents. If the document is a folder, each of the documents contained therein has a pointer or LADN entry in this object. If this document is in one or more folders, then each folder has a pointer or LADN entry in this object. Enter and remove history may be maintained for the document either as a folder or as a document in other folders.

An access control model object is created when the document owner authorizes other users to access the document.

Structures for all of the above-identified objects except document relations object (DRO) are a part of the DISOSS office system and will not be described herein. Every document stored in system 10 has a document relations object associated therewith. FIG. 3 shows the structure of the DRO which consists of the following: an attribute parameter set, a folder document parameter set, a document-within-a-folder (DIF) parameter set, a staplee parameter set and a stapler parameter set.

The attribute parameter set indicates whether or not the document associated with the DRO is a folder or whether or not the document is a 'folder-only' document. Additionally, the attribute parameter set indicates whether or not in a stapled relationship the associated document is designated as a "staplee" or as a "stapler" with respect to another document. A staplee document is a document which is stapled by another document. A stapler document is a document which is stapled to another document. FIG. 4 illustrates the structure for the attribute parameter set. A folder attribute indicates whether or not the document associated with the document relation object is a folder. If the document is a folder, then a folder section parameter set is required. A DIF (document in folder) attribute indicates whether or not the document is contained within any folders. A folder-only attribute indicates whether or not the document can be viewed as existing on its own when it is included within a folder. Documents are viewed as folder-only when both the DIF and Folder-only attributes are positively set.

A physical document in a physical folder is a folder-only document. In essence, the physical document exists in the folder and can not stand on its own. However, electronic documents can logically exist in multiple places at the same time. Therefore, a document can appear to be in more than one folder and standing on its own all at the same time. Whether or not the document can stand on its own when it is also in a folder is indicated by the folder-only attribute. Folder-only documents are viewed as stand-alone when they are not contained by any folders.

The staplee attribute indicates whether or not the document associated with the DRO is a stapled by another document. The stapler attribute indicates whether or not the document associated with the DRO is stapled to another document.

FIG. 5 illustrates the structure for the staplee section parameters. The staplee parameters associated with the DRO is defined as a repository for information specific to a document stapled by another document. The staplee parameters are created when the document associated with the DRO is stapled by another document. The staplee parameters are preserved with the document until the document is deleted from a document library or the document is unstapled by its last document. The attributes parameter allows for the specification of a history option when the document is stapled and unstapled by another document. The history option determines the maintenance of a related document parameter set associated with the document. The related document parameter set is either deleted when the document is unstapled by another document and maintained when the document is stapled by another document. Alternatively, the related document parameter set is maintained when the document is unstapled by another document. The request date, time and requester's identification are added to the related document parameter set. When the document is restapled by the same document, the new staple date, time and the requester's identification are added to the related document parameter set.

The related document parameter set includes the following: a related document parameter introducer, the LADN of the document by which the document is stapled, a user-assigned document name of the other document, the context in which this document was stapled by the other document, the date and time this document was stapled by the other document, the identification of the staple requester, and the date and time the document was unstapled and the identification of the unstaple requester if the history option is specified.

FIG. 6 illustrates the structure for the staplee related document subparameters. The stapler LADN is a unique name assigned to the other document by the server library when the other document was filed in the library. The document name parameter identifies the other document by its user-assigned name. The context parameter set specifies the context in which this document is stapled by the other document: the context can be all folders, a set of folders, an application, or a set of applications. The other document can appear in more than one folder. The context parameter can be used to specify in which folders this document appears to be stapled by the other document. Similarly, the context parameter can be used to specify that this document is stapled by the other document in the context of an application. For purposes of illustration and not limitation, an application used to highlight data in a document could create an overlay template and staple it to another document. When the application is used, the template highlights the data without disturbing the original document. Moreover, the template may not have any meaning outside of the context of the application.

The add data subparameter specifies the date the document was stapled by the other document, the address of the requester. The remove data subparameter specifies the date the document was unstapled by the other document and the address of the requester.

The stapler section of the DRO is defined as a repository for information specific to a document stapled to another document. The structures (not shown) associated with the stapler parameter set are identical those set forth above and in FIGS. 3 through 6 for the staplee parameter set except reference is made to the document stapled to another document.

Set out below is an illustration of an application program useable by the requester application 16 in filing stapled documents within the context of an application in the information processing system. The application program is in program design language from which source code and machine code are derivable.

```
BEGIN REQUESTER PROC
    INPUT
```

```
                    -continued
        ACCESS CONTROL INFORMATION
        CONTEXTUAL-SEARCH CHARACTERISTICS
        DO FOR EACH DOCUMENT SPECIFIED IN
        THIS
           REQUEST:
              A POINTER TO THE PHYSICAL
              DOCUMENT (PPTR) WHICH WILL BE
              EITHER THE LOCAL POINTER
              OR THE LIBRARY IDENTIFIER.
              A UNIQUE IDENTIFIER (DID) FOR THIS
              DOCUMENT WITHIN THE SCOPE OF THIS
              REQUEST.
              A REFERENCE IDENTIFIER (RID) FOR
              EACH STAPLER BY WHICH THIS
              DOCUMENT IS ATTACHED.
              AN INDICATOR SHOWING THAT THE
              DOCUMENTS ARE STAPLED WITHIN THE
              CONTEXT OF ONE OR MORE
              APPLICATIONS.
              NAMES OF THE APPLICATIONS IN WHOSE
              CONTEXT THE STAPLE RELATION IS
              DEFINED.
              HISTORY ATTRIBUTES FOR THE
              DOCUMENTS.
           ENDDO
        PROCESS
           SET THE ACCESS CONTROL, CONTEXTUAL-
           SEARCH CHARACTERISTICS, AND
           IDENTIFIERS.
           DO FOR EACH DOCUMENT (IDD OR RDD)
              EXPLICITLY SPECIFIED IN THE
              REQUEST:
              IF THE DOCUMENT DOES NOT EXIST IN
                 THE LIBRARY, THEN
                    COPY THE DOCUMENT.
                    SET THE DOCUMENT ADDRESS (PPTR)
                    TO POINT TO THE POSITION OF THE
                    DOCUMENT IN THE REQUEST UNIT.
                    SET UP THE DATA OBJECT (DRO)
                    WHICH WILL CONTAIN THE UNIQUE
                    LIBRARY IDENTIFIER FOR THE
                    DOCUMENTS WHICH WILL BE STAPLED
                    TO THIS DOCUMENT (STETOC).
                    SET THE STAPLEE ATTRIBUTES
                    (HISTORY) IN THE (DRO) AS
                    SPECIFIED.
                    SET UP THE DATA OBJECT (DRO)
                    WHICH WILL CONTAIN THE UNIQUE
                    LIBRARY IDENTIFIER FOR THE
                    DOCUMENTS WHICH WILL BE STAPLED
                    BY THIS DOCUMENT (STRTOC).
                    SET THE STAPLER ATTRIBUTES
                    (HISTORY) IN THE (DRO) AS
                    SPECIFIED.
              ENDIF
              SET SPECIFIED IDENTIFIER FOR THIS
              DOCUMENT (DID).
              DO FOR EACH DOCUMENT (RID) STAPLED
                 TO THIS DOCUMENT:
                    SET THE RID FOR THE STAPLER FOR
                    THIS IDD OR RDD.
                    SET THE RELATIONSHIP TO STAPLE FOR
                    THIS IDD OR RDD.
                    DO FOR EACH APPLICATION IN WHOSE
                       CONTEXT THE PAIR IS STAPLED:
                          SET THE ACON FOR THIS RID SET
                          TO THE NAME OF THE
                          APPLICATION.
                    ENDDO
              ENDDO
           ENDDO
           OUTPUT
              SEND COMPLETED REQUEST TO
              LIBRARY SERVER.
        END REQUESTER PROC
```

An end user (EU) or an application program can create two documents, attach them in a staple relationship and file the attached pair of documents into the library 12. Moreover, the EU can stipulate that the staple relationship between the pair of documents only exists within an application. Subsequent operations on the pair of documents can be performed on the documents separately or as a stapled pair of documents within the context of the application or applications. For purposes of illustration and not limitation, a document and the document attached thereto can be retrieved or printed by only referring to one of the documents in the staple relationship.

The EU interacts with the dialogue manager application program 14 and enters a request to create the staple relationship between two documents in the context of the application or applications which include the following data: access control, contextual-search characteristics, and requester/principle identifiers. The EU also defines the staple relationship by entering an indication that the relationship is restricted to the context of a specified application, a reference to each specified applications within whose context the staple relationship occurs, and stapler/staplee attributes of the documents to be filed including whether or not history is to be maintained. A stapler document is attached to a staplee document. Additionally, the definition of the staple relationship includes pointers to the physical location of all of the documents to be filed. These documents may be directly accessible to the requester application program 16 or accessible to the requester's server 18.

Figure 7:
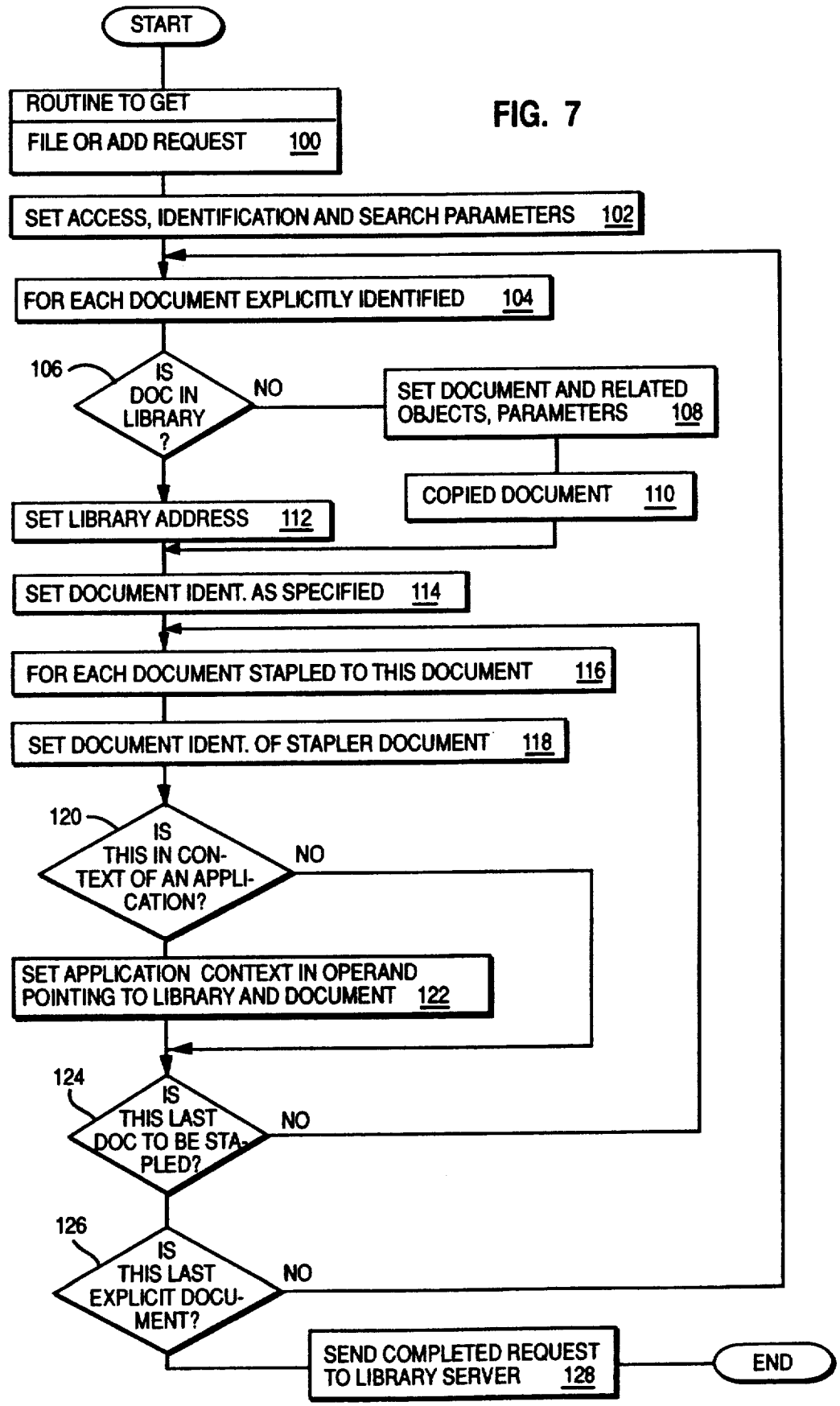
FIGS. 7 through 9 are various flow charts illustrating detailed steps of the method of the present invention.

Referring to FIG. 7, there is shown a flow diagram for the requester application program 16 in filing stapled documents in the library 12 in the context of an application or applications. The requester application program 16 interfaces with the dialogue manager application 14 in step 100 to get the request entered by the EU. In step 102, the requester application program 16 builds operands specifying the access, contextual-search characteristics, requester and principle identifiers for all of the specified documents. The requester application program 16, in steps 104 through 112, builds an operand for each document explicitly specified in the request. If the document is passed with the request, an IDD operand is generated. If the document is already stored in the library 12, a RDD operand is generated. The IDD and RDD operands, respectively, include a pointer to the physical location of the document (PPTR). The RDD operand will contain a library pointer. The IDD operand will contain a pointer to the document unit contained within the request. The IDD and RDD operands also include a unique document identifier (DID) within the scope of the request. Moreover, the IDD and RDD operands may include optional references to documents stapled to this document (RID=DID of the stapler document).

The requester application program 16 also builds data areas which are associated with each of the documents specified in the request. A document relation object (DRO) contains the data for documents stapled by another (STETOC), the history attribute for documents stapled to another and data for documents stapled to another (STRTOC). After all of the documents which are not stored in the library 12 are copied, the specified identifier for this document is set in step 114.

In steps 116 and 118, for each document (RID) which is stapled to a document (IDD or RDD) specified in the request, a document RID and the relationship to the stapler are set. The staplee operand IDD or RDD has a subfield which is called RID. The value of RID is set to the unique identifier (DID) associated with the stapler's operand (IDD or RDD). Moreover, the relationship suboperand for the staplee document is set to indicate the staple relationship. It should be noted that a document can be stapled by or to a plurality of documents. In step 120, a determination is made whether the staple relationship is to exist within the context of an application. In step 122, for each application specified in the request, an application context, ACON suboperand, is set equal to the name of the application. The ACON suboperand for the staplee operand indicates that the staple relationship occurs within the context of the application whose name equals the ACON value. Step 124 determines whether there are other documents to be stapled to the document under consideration. Steps 116 through 122 are repeated for each of the documents stapled to the document under consideration.

Step 126 determines if all of the documents specified in the request have been processed and steps 104 through 124 are repeated for any remaining unprocessed documents. Otherwise, a completed request is transmitted to the requester's server 18 in step 128.

```
BEGIN LIBRARY SERVER PROC
    INPUT
        ACCESS CONTROL INFORMATION.
        CONTEXTUAL-SEARCH CHARACTERISTICS.
        REQUESTER/PRINCIPLE IDENTIFIERS.
        DO FOR EACH DOCUMENT SPECIFIED IN
          THIS REQUEST, BUILD AN IDD OR A RDD
          OPERAND WHICH INCLUDES:
            A POINTER TO THE PHYSICAL
              DOCUMENT (PPTR) WHICH WILL BE
              EITHER THE LOCAL POINTER (IDD
              OPERAND) OR THE LIBRARY
              IDENTIFIER (RDD OPERAND).
            AN UNIQUE IDENTIFIER (DID) FOR THIS
              DOCUMENT WITHIN THE SCOPE OF THIS
              REQUEST.
            A REFERENCE IDENTIFIER (RID) FOR
              EACH DOCUMENT STAPLED TO THIS
              DOCUMENT.
            A NAME FOR EACH APPLICATION (ACON)
              IN WHOSE CONTEXT THE PAIR IS
              STAPLED.
            A DOCUMENT RELATION OBJECT (DRO)
              CONTAINING THE FOLLOWING:
                DOCUMENT RELATION ATTRIBUTES.
                A STAPLER ATTRIBUTE.
                A STAPLER TABLE-OF-CONTENTS
                  (STRTOC) AREA WHICH WILL BE SET
                  UP BUT WILL NOT CONTAIN ANY
                  ENTRIES.
                A STAPLEE ATTRIBUTE.
                A STAPLEE TABLE-OF-CONTENTS
                  (STETOC) AREA WHICH WILL BE SET
                  UP BUT WILL NOT CONTAIN ANY
                  ENTRIES.
        ENDDO
    PROCESS
        CALL BUILD TABLES PROC TO BUILD DID/LADN
          AND RID/DID TABLES.
        DO FOR EVERY STAPLER (RID ENTRY):
            DO FOR EVERY STAPLEE (DID) TO BE
              STAPLED BY THIS STAPLER:
                PUT THE LADN ASSOCIATED WITH THIS
                  DID IN THE STAPLER'S
                  TABLE-OF-CONTENTS.
                IF HISTORY IS SPECIFIED FOR THIS
                  STAPLER, THEN
                    SET THE REQUESTER'S ID IN THE
                      HISTORY PORTION OF THE ENTRY.
                    SET THE PRINCIPLE'S ID IN THE
                      HISTORY PORTION OF THE ENTRY.
                    SET THE CURRENT DATE AND TIME
                      IN THE HISTORY PORTION OF THE
                      ENTRY.
                ENDIF
                DO FOR EVERY APPLICATION IN WHOSE
                  CONTEXT THE STAPLE RELATION IS
                  -continued
                  DEFINED:
                    SET THE APPLICATION'S NAME
                      INTO THE APPLICATION CONTEXT
                      SECTION FOR THIS STAPLER
                      ENTRY.
                    SET THE APPLICATION NAME
                      INTO THE APPLICATION CONTEXT
                      SECTION FOR THIS STAPLEE
                      ENTRY.
                ENDDO
                PUT THE LADN ASSOCIATED WITH THIS
                  STAPLER (RID) IN THE STAPLEE
                  TABLE-OF-CONTENTS.
                IF HISTORY IS SPECIFIED FOR THIS
                  STAPLEE, THEN
                    SET THE REQUESTER'S ID IN THE
                      HISTORY PORTION OF THE ENTRY.
                    SET THE PRINCIPLE'S ID IN THE
                      HISTORY PORTION OF THE ENTRY.
                    SET THE CURRENT DATE AND TIME
                      IN THE HISTORY PORTION OF THE
                      ENTRY.
                ENDIF
            ENDDO
        ENDDO
    END PROCESS
END LIBRARY SERVER PROC
```

As noted above, each document operand (IDD or RDD) has a unique identifier (DID) assigned thereto. The library server 18 than gets a LADN for every document explicitly specified in the request. As shown in Table 1 below, a BUILD TABLE PROC is called to build a temporary table to match every DID to an associated LADN.

TABLE 1

| DID | LADN |
| --- | --- |
| 1 | LADN1 |
| 2 | LADN2 |
| 3 | LADN3 |
| 4 | LADN4 |
| 5 | LADN5 |
| 6 | LADN6 |
| 7 | LADN7 |
| 8 | LADN8 |
| 9 | LADN9 |

Moreover, each document operand which corresponds to a document that will be stapled by a stapler document includes a reference (RID) to that stapler document's unique document identifier (DID). The RID with the document operand is set to the value of the stapler document's operand's DID. The library server 18 then facilitates the building of a temporary table containing an entry for each stapler document referenced. Each entry for a stapler document will contain a list of DIDs representing the documents that are stapled by this stapler document. Each DID will be associated with the application or applications in whose context the staple relationship occurs.

For purposes of illustration and set forth in the Table 2 below, a stapler document with a DID of 1 is stapled to staplee documents with DIDs 3, 2, and 4. However, the stapler document 1 is only stapled to staplee document 3 in the context of applications having names A and B. A stapler document with a DID of 4 is stapled to staplee documents with DIDs 5, 2, and 6. However, the staplee document 6 is stapled by the stapler document 4 only in the context of an application having a name C. The document operand for staplee document 3 contains one RID for the specified stapler document 1. Moreover, the staplee document 3 also includes two ACONs associated with the stapler document 1.

TABLE 2

| RID | DID(ACON) |
|---|---|
| 1 | 3(A,B)/2/4 |
| 4 | 5/2/6(C) |

The operands for all of the documents may be similar to that shown in Table 3:

TABLE 3

DID=1
DID=2,(RID=1,RELATION=STAPLE),(RID=4, RELATION=STAPLE)
DID=3,(RID=1,RELATION=STAPLE,ACON=A, ACON=B)
DID=4,(RID=1,RELATION=STAPLE)
DID=5,(RID=4,RELATION=STAPLE)
DID=6,(RID=4,RELATION=STAPLE,ACON=C)

Figure 8:
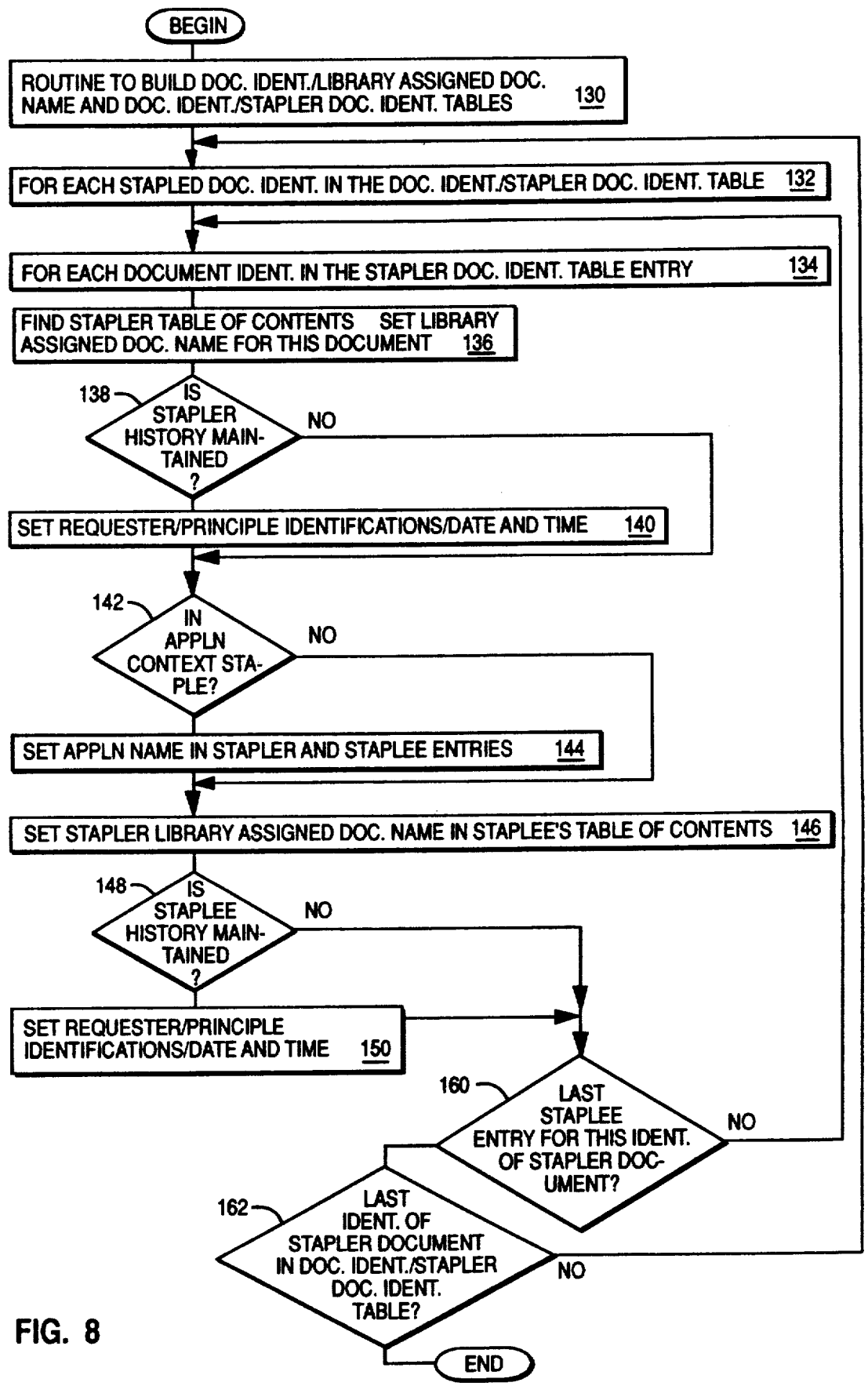

Referring to FIG. 8, there is shown a flow diagram for the server 18 in filing the stapled documents in the library 12. In step 130, the server 18 calls a build tables routine to build DID/LADN and RID/DID tables. In steps 132, 134 and 136, for each stapler document RID and each document DID in the RID table entry, find stapler table-of-contents (STRTOC) and create the appropriate entry for this staplee document therein. The entry in the STRTOC includes a LADN for the staplee document and any history information. In step 138, a determination is made as to whether the stapler document history is to be maintained. If history is to be maintained on the stapler document, requester and principle user IDs and the current date and time are set in step 140. The requester user is one who is performing the request. The principle user is one on whose behalf the requester user may be acting. Generally, the requester and principle users are the same person or application. Step 142 determines whether the staple relationship is to occur with an application context. In step 146, an entry is made in the staplee table-of-contents (STETOC) for the stapler document. The entry in the STETOC includes a LADN for the stapler document and any history information. Step 148 determines whether history is to be maintained for the staplee document. The requester/principle users, current date and time are set in step 150 if history is to be maintained. Step 160 determines whether all staplee document have been processed. If there are other staplee documents to be processed, steps 134 through 150 are repeated. Step 162 determines whether the last RID in the RID/DID table has been processed. If there are other RIDS to be processed, control is transferred to step 132.

Set out below is an illustration of an application program useable by the server 18 in building the DID/LADN and RID/DID tables. The program is in program design language from which source code and machine code are derivable.

```
BEGIN BUILD TABLES PROC
    DO FOR EACH DOCUMENT SPECIFIED IN THE
    REQUEST:
        IF THE DOCUMENT DOES NOT EXIST IN THE
        LIBRARY, THEN
            COPY THE DOCUMENT AND ITS
            RELATED OBJECTS INTO THE LIBRARY.
            ASSIGN AN UNIQUE LIBRARY
            IDENTIFIER (LADN) TO THIS DOCUMENT.
        ELSE
            OBTAIN THE UNIQUE LIBRARY
            IDENTIFIER (LADN) FOR THIS
            DOCUMENT.
        ENDIF
        SAVE THE UNIQUE IDENTIFIER (DID) FOR
        THE REQUEST WITH THE UNIQUE LIBRARY
        IDENTIFIER (LADN) IN DID/LADN TABLE.
        DO FOR EACH STAPLER REFERENCED (RID)
        BY THIS DOCUMENT OPERAND:
            IF THERE IS NO ENTRY IN THE RID/DID
            TABLE, THEN
                CREATE AN ENTRY FOR THIS RID IN
                THE TABLE.
            ENDIF
            SET DID IN THE RID/DID TABLE.
            IF THIS STAPLE RELATION IS IN THE
            CONTEXT OF AN APPLICATION, THEN
                SET THE APPLICATION'S NAME INTO
                THE ACON FIELD FOR THIS STAPLER
                ENTRY.
            ENDIF
        ENDDO
    ENDDO
END BUILD TABLES PROC
```

The server 18 keeps track of the order in which document operands are specified. The server 18 builds an entry in the temporary table for every document specified in the IDD or RDD operand. Each entry matches a DID to a LADN. Additionally, if the current document operand references a stapler document by which is will be stapled, the RID/DID temporary table is updated. The server 18 then processes a IDD if the document does not exist in the library 12. The document is then filed into the library 12 along with its associated data areas which includes the DRO and assigns a new LADN to the document. Thereafter, server 18 processes a RDD if the document does exist in the library 12 and builds the appropriate entries in the RID/DID temporary table for the document.

Figure 9:
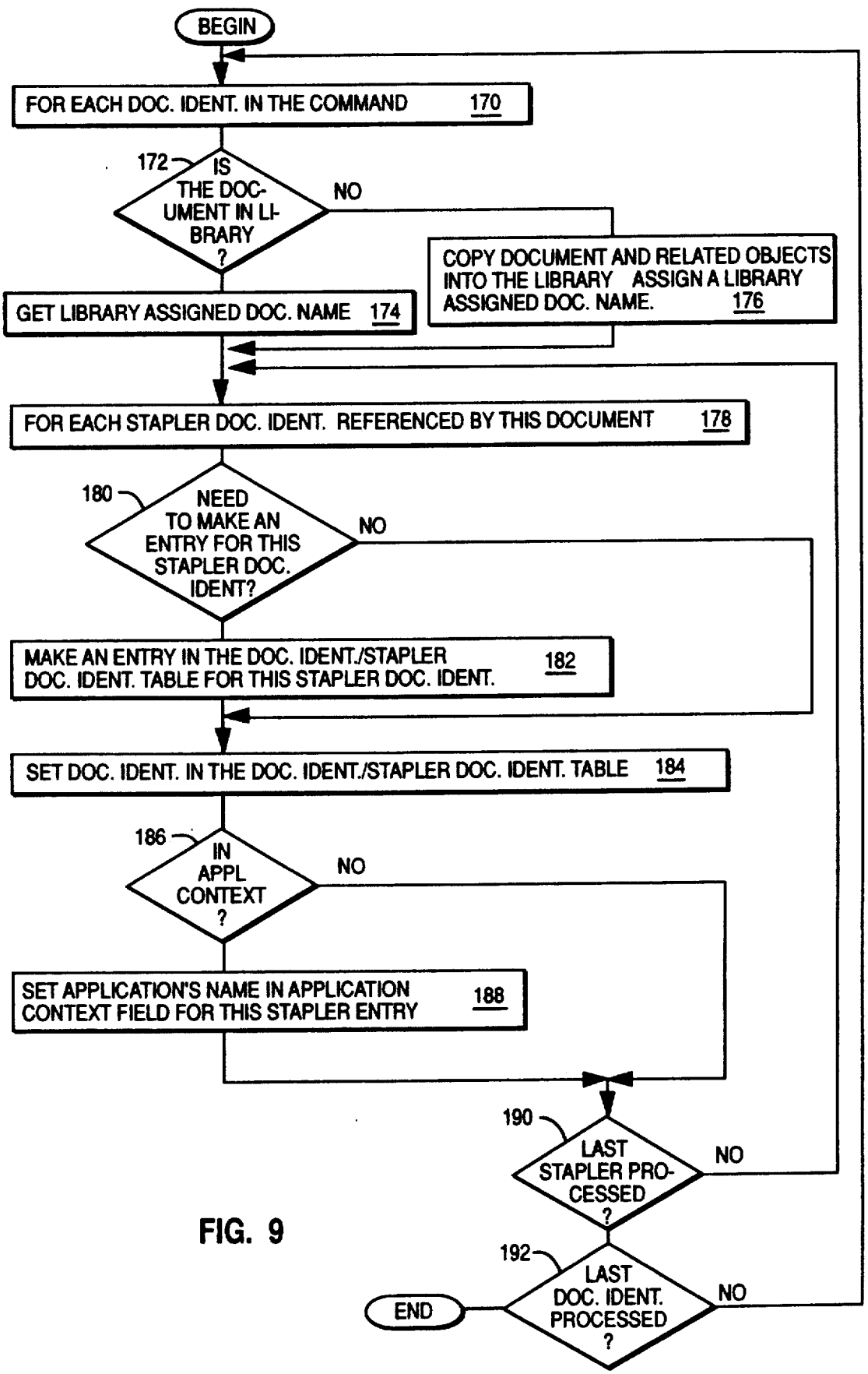

Referring to FIG. 9, there is shown a flow diagram for the build table routine in generating the RID/DID and DID/LADN tables. As noted above, the build table routine is called by the server 18. For each DID in the call command, a determination is made in steps 170 and 172 whether the document associated with each respective DID exists in the library 12. If the document is not in the library 12, a copy of the document and its related objects is made and a LADN is assigned thereto in step 176. Otherwise, the LADN for the document filed in the library 12 is fetched in step 174. For each stapler document RID referenced by this document, a determination is made in steps 178 and 180 whether an entry has to be made in the RID/DID table. An entry is made in the RID/DID table in step 182 if required. The DID is set in step 184. Step 186 determines whether the staple relationship occurs within an application context. The application's name is set in the ACON field for this stapler document entry. Step 190 determines whether all of the stapler documents have been processed and transfers control to step 178 if there are other stapler documents to be processed. Step 192 determines whether the last DID has been processed and transfers control to step 170 if there are other DIDs to be processed.

In summary, the invention relates to a method of filing stapled documents in an information processing system within a context of an application. An end user indicates to the system that a staple relationship is to be created between at least two identified documents stored in therein. The staple relationship is then defined by entering an indication that the staple relationship is restricted to the context of the application, the name of the application, stapler/staplee attributes of the at least two documents including whether or not history is to be maintained and pointers to the physical locations of the at least two documents in the system. In response to the entry of data defining the staple relationship, a file request is transmitted to the library server along with copies of any documents which are not filed in the library. The server will set the data objects associated with the identified documents to reflect the staple relationship. Thereafter, the server files the identified documents into the library as specified by the staple relationship defined by the end user.

What I claim is:

1. In an electronically automated information processing system having a plurality of documents stored thereon, a method for a user of said system to file documents having a directed relationship within said system, said method comprising the steps of:

identifying in said system two of said plurality of documents to have said direct relationship within said system;

defining in said system a staple relationship between said two documents and identifying a staplee document and a stapler document;

specifying in said system history attributes for said identified documents;

indicating a location within said information processing system for each of said identified documents;

specifying at least one application program operable in said system within whose context said staple relationship exists; and creating and directly relating a data object to said identified stapler document, which data object contains a unique identifier for each document attached by staple relationship to said stapler document and any history attributes for documents attached by staple relationship to said stapler document.

2. The method as recited in claim 1 further includes the step of creating within said system a data object which is related to said identified staples document and contains said unique identifier for each document attached to said staplee document and any history attributes relating said documents attached to said staplee document.

* * * * *